US009596221B2

(12) United States Patent
Lepeshenkov et al.

(10) Patent No.: US 9,596,221 B2
(45) Date of Patent: Mar. 14, 2017

(54) ENCRYPTION OF USER DATA FOR STORAGE IN A CLOUD SERVER

(71) Applicant: Kaspersky Lab ZAO, Moscow (RU)

(72) Inventors: Konstantin E. Lepeshenkov, Moscow (RU); Eldar M. Kononov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 203 days.

(21) Appl. No.: 14/460,545

(22) Filed: Aug. 15, 2014

(65) Prior Publication Data

US 2015/0371052 A1 Dec. 24, 2015

(30) Foreign Application Priority Data

Jun. 20, 2014 (RU) ................. 2014125116

(51) Int. Cl.
*H04L 29/06* (2006.01)
*G06F 21/31* (2013.01)
*H04L 9/08* (2006.01)
*H04L 9/32* (2006.01)
*G06F 21/62* (2013.01)

(52) U.S. Cl.
CPC ...... *H04L 63/0435* (2013.01); *G06F 21/6236* (2013.01); *H04L 9/0863* (2013.01); *H04L 9/0866* (2013.01); *H04L 9/0872* (2013.01); *H04L 9/3226* (2013.01); *H04L 63/06* (2013.01); *H04L 63/08* (2013.01)

(58) Field of Classification Search
CPC ... G06F 21/6218; G06F 21/31; H04L 9/0866; H04L 63/0428; H04L 9/0863; H04L 63/0435
See application file for complete search history.

(56) References Cited

U.S. PATENT DOCUMENTS

| 8,285,681 | B2 | 10/2012 | Prahlad et al. |
| 2007/0157309 | A1* | 7/2007 | Bin ............... H04L 63/0272 726/15 |
| 2010/0070577 | A1 | 3/2010 | Relyea et al. |
| 2010/0332456 | A1 | 12/2010 | Prahlad et al. |
| 2012/0303830 | A1* | 11/2012 | Tobioka ............ G06F 21/31 709/229 |

(Continued)

FOREIGN PATENT DOCUMENTS

| CN | 102638568 A | 8/2012 |
| CN | 103595730 A | 2/2014 |

(Continued)

*Primary Examiner* — Amir Mehrmanesh
(74) *Attorney, Agent, or Firm* — Arent Fox LLP; Michael Fainberg (57) ABSTRACT

Disclosed are systems, methods and computer program products for encryption of user data for storage on a remote network server. In one aspect, an example method includes collecting, by a software client, one or more sets of user authentication data from a user device; performing user authentication using one or more sets of user authentication data; when user authentication is successful, calculating a hash of at least one set of the user authentication data; generating an encryption key from the hash of the user authentication data; encrypting the user data using the generated encryption key; and transmitting the encrypted user data to the remote network server for storage.

20 Claims, 6 Drawing Sheets

(56) References Cited

U.S. PATENT DOCUMENTS

2013/0262873 A1* 10/2013 Read ............... H04W 12/06
713/186
2014/0101444 A1* 4/2014 Lee ............... H04L 63/0428
713/168

FOREIGN PATENT DOCUMENTS

EP 2710510 A2 3/2014
RU 2308080 C2 10/2007

* cited by examiner

ENCRYPTION OF USER DATA FOR STORAGE IN A CLOUD SERVER

CROSS-REFERENCE TO RELATED APPLICATIONS

This application claims benefit of priority under 35 U.S.C. 119(a)-(d) to a Russian Application No. 2014125116 filed on Jun. 20, 2014, which is incorporated by reference herein.

FIELD OF TECHNOLOGY

The present disclosure relates generally to the field of data security, and, more specifically, to systems, methods and computer program products for encrypting user data for storage on a cloud server.

BACKGROUND

Cloud technologies are becoming become increasingly popular. They provide storage and processing of user data on remote network servers, which are accessed via the Internet. In this context, the question of the security of the user data stored in the cloud becomes an issue. Generally, user data, stored on a remote network server, is provided to a user in unprotected form after the user is authenticated with the server. In this case, an unauthorized access to the data becomes possible through various security vulnerabilities and malicious technologies.

Known data protection systems encrypt user data stored on remote network servers. However, these systems have number of shortcomings. For example, when user data stored on remote servers is encrypted, it is generally secure from attacks from outside; however, access to the data can be obtained at the server end (for example, by hackers gaining access to the server), since the data (such as user passwords) used to encrypt the user data is also stored on the same servers. In addition, the longer the data is stored on the server in unaltered form the greater the chance of hackers succeeding in decrypting it. Moreover, the mechanisms for protection of user data at the server end are almost always hidden from the user and cannot be checked by the users, which undermines the user's trust in the security of the cloud server.

Therefore, there is a need to improve mechanisms of protecting user data stored on remote network servers.

SUMMARY

Disclosed are example aspect of systems, methods and computer program products for encrypting user data for storage on a remote network server (e.g., a cloud server).

In one aspect, an example method for encryption of user data for storage on a remote server comprises collecting, by a software client executed by a hardware processor, one or more sets of user authentication data from a user device; performing user authentication using one or more sets of user authentication data; when user authentication is successful, calculating a hash of at least one set of the user authentication data; generating an encryption key from the hash of the user authentication data; encrypting the user data using the generated encryption key; and transmitting the encrypted user data to the remote network server for storage.

In another aspect, a software client may include software installed on the user device.

In another aspect, a software client may include a web-based service.

In another aspect, the user authentication data may include one or more sets of: user's login and password, user's email account name and password, user's social network account name and password, user's instant messaging account name and password, one or more user's biometric identifiers, one or more unique identifiers of the user device, and geolocation data of the user device.

In another aspect, generating an encryption key may include generating an encryption key using a symmetric-key encryption technique.

In another aspect, generating an encryption key includes generating an encryption key using a cryptographic salt and a portion of the user authentication data.

In another aspect, the method includes automatically performing repeat encryption of the user data using a new set of user authentication data when at least one of the following conditions occur: upon change in the user authentication data; when the user has undergone authentication by a predetermined number of times since the last repeat data encryption, and when a predetermined interval of time has passed since the last repeat data encryption.

In another aspect, an example system for encryption of user data for storage on a remote server, comprising: a software client configured to collect one or more sets of user authentication data from a user device; a user authentication module configured to perform user authentication using one or more sets of user authentication data; when user authentication is successful, calculate a hash of at least one set of the user authentication data; a module of generating an encryption key configured to generate an encryption key from the hash of the user authentication data; an encryption module configured to encrypt the user data using the generated encryption key; and the software client further configured to transmit the encrypted user data to the remote network server for storage.

In yet another aspect, an example computer program product, stored on a non-transitory computer-readable storage medium, comprises computer-executable instructions for encryption of user data for storage on a remote server, including instructions for collecting, by a software client executed by a hardware processor, one or more sets of user authentication data from a user device; performing user authentication using one or more sets of user authentication data; when user authentication is successful, calculating a hash of at least one set of the user authentication data; generating an encryption key from the hash of the user authentication data; encrypting the user data using the generated encryption key; and transmitting the encrypted user data to the remote network server for storage.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for encrypting user data stored on a remote network server. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
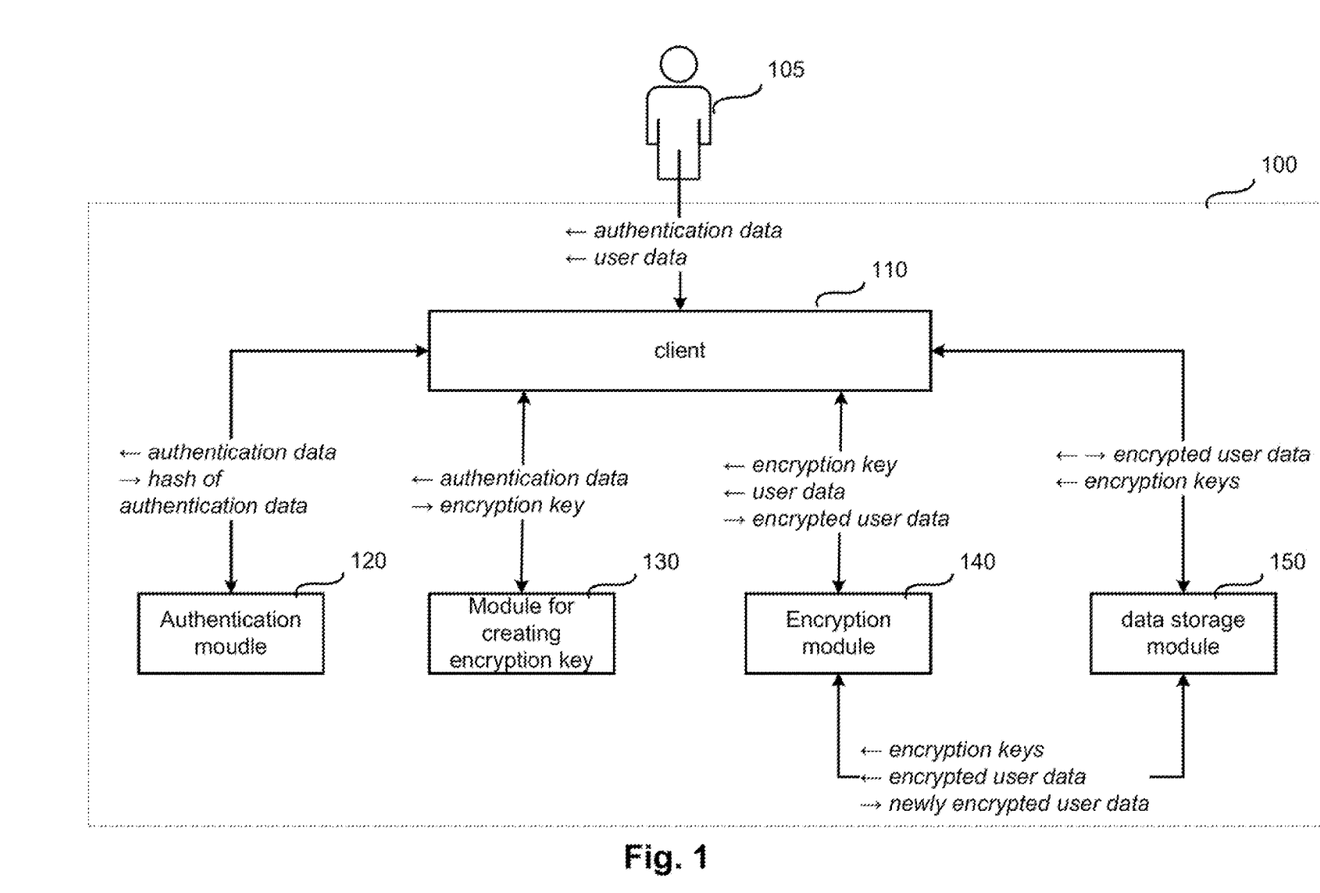
FIG. 1 illustrates a schematic diagram of an example system for encrypting user data stored on a remote network server according to one aspect.

FIG. 1 shows a schematic diagram of an example system for encrypting of user data stored on a remote network server (e.g., cloud server) according to one aspect. The system 100 for encrypting of user data includes a client 110, an authentication module 120, a module of creating encryption keys 130, an encryption module 140 and a data storage module 150. In one aspect, the client 110 may include software installed on a user's device (such as a personal computer, a notebook or a smartphone) or operating remotely, for example, as a web service to which the user gains access via a web browser. In case of remote operation, the client 110 may be hosted by the remote network server (not shown) where the user data is being stored or by an independent third-party data security provider. In various aspects, modules 120-130 may be implemented as part of the client 110 or as part of the remote network server. In case of a separate implementation, the client 110 may communicate with modules 120-130 via Internet using secure protocols, such as Hypertext Transfer Protocol Secure (HTTPS).

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module may include software executed on the processor of a general purpose computer (such as the one described in greater detail in FIG. 6 below). Accordingly, each module can be realized in a variety of suitable configurations, and should not be limited to any particular implementation exemplified herein.

In one example aspect, the client 110 may be configured to collect user data from the user's device, encrypt the data using the encryption module 140 and send the encrypted data for storage to the data storage module 150, which, in one example aspect, may implemented on the remote network server (e.g., a cloud server). The client 110 may be also configured to receive encrypted user data from the data storage module 150, decrypt the data using the encryption module 140 and provide the decrypted data to the user 105 for further processing. The encrypted user data may be transmitted between the client 110 and the data storage module 150 via Internet using secure or unsecure network protocols, such as HTTP, HTTPS, FTP, FTP secured with SSL/TLS (FTPS) or other types of data communication protocols.

For example, the user data that may be stored on the data storage module 150 and that may be encrypted using techniques disclosed herein may include, but not limited to: multimedia files (e.g., photos, videos, music, etc.), electronic documents, geolocation data of the user's device, usage statistics of the user's device, usage statistics of the software installed on the user's device, Internet usage statistics, user account records, chat room correspondence logs, instant messaging correspondence logs, and other data generated by the user's device.

In one aspect, the authentication module 120 may be configured to receive one or more sets of user authentication data from the client 110. The authentication data may include, but not limited to: user's login and password, user's email account names and passwords, user's social networks account names and passwords, user's instant messaging account names and passwords, various user's biometric identifiers, unique identifiers of the user's device (e.g., SIM card number), geolocation data of the user's device, and other type of user authentication data. The authentication module 120 may be further configured to authenticate the user by, for example, comparing the received one or more sets of user authentication data with a previously saved set(s) of user authentication data. If the user authentication is successful, the authentication module 120 may calculate a hash of one or more sets of user authentication data (e.g., SHA256 or MD5), and send it to the client 110.

In one aspect, the module of creating encryption keys 130 may be configured to receive the hash of the user authentication data from the client 110, create on the basis of the received hash an encryption key and to send this to the client 110. For example, the module of creating encryption keys 130 may use the hash of the user authentication data to generate an encryption key suitable for AES encryption or other type of symmetric-key encryption method.

In one aspect, the encryption module 140 may be configured to receive the user data and the encryption key (for example, from the client 110 or the data storage module 150), to encrypt the received user data and to send back the encrypted data, as well as to receive the encrypted user data and encryption key, to decrypt the received user data and to send back the decrypted data, and furthermore to receive the encrypted user data and encryption keys, to again encrypt the received user data and to send back the twice encrypted data. For example, a symmetric-key encryption, e.g., AES encryption, may be used to encrypt user data.

In one aspect, the data storage module 150 may be implemented on the remote network server. The data storage module 150 may be configured to receive the encrypted user data from the client 110, store it in a data storage (e.g., hard disk drive), and in certain situations (e.g., upon change of the user authentication data) encrypt the user data again.

In various aspect, the encryption of the user data may take place in the following cases, including, but not limited to: when the user sends data to the remote network server (FIG. 2); when the user receives data from the remote network server (FIG. 3); upon change in the user authentication data (FIG. 4); and/or when certain conditions are met for the saving of user data on the remote network server (FIG. 5), which will be described in greater detail herein below.

Figure 2:
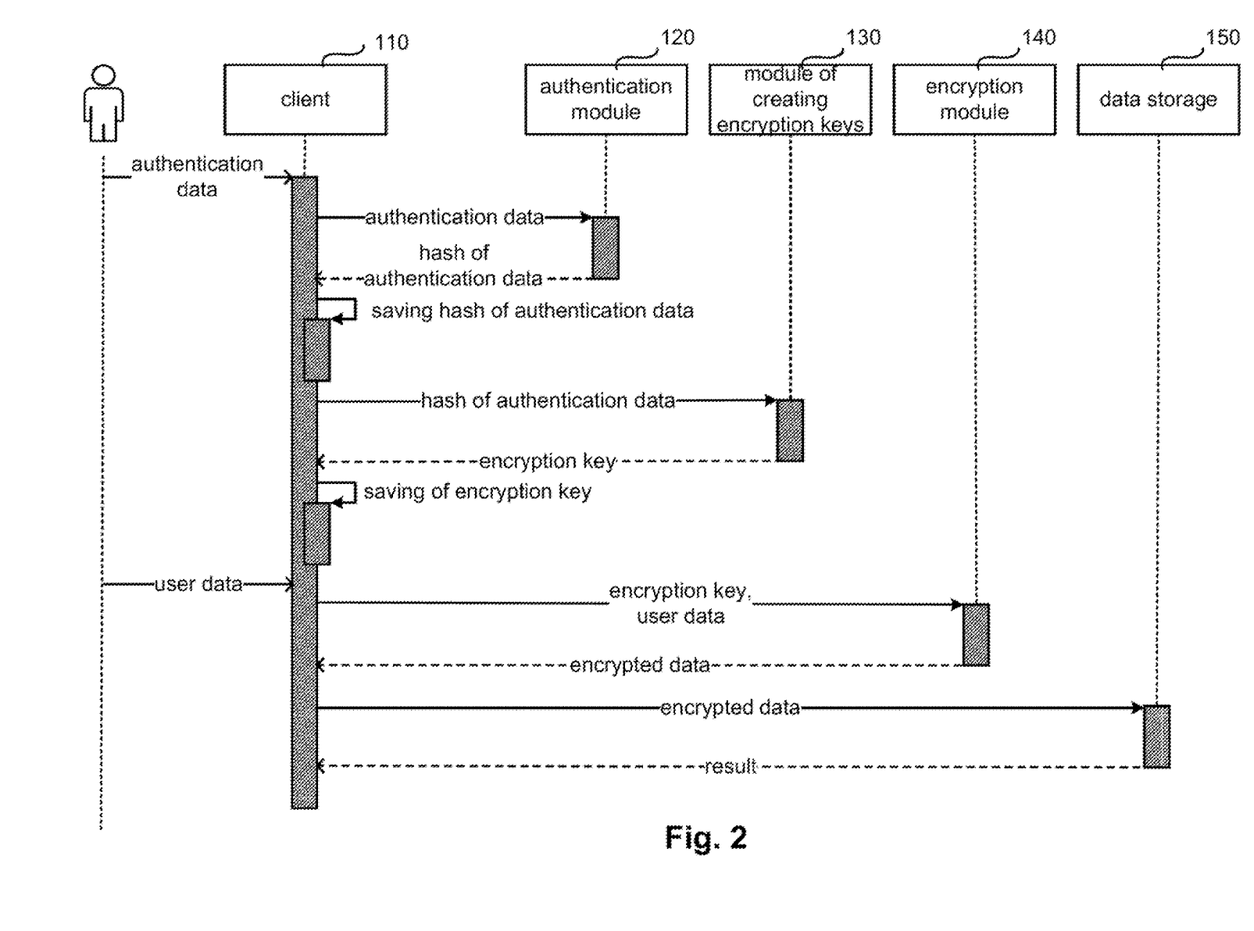
FIG. 2 illustrates a data flow diagram of an example sequence of steps for transmitting user data to a remote network server according to one aspect.

FIG. 2 shows a diagram of an example sequence of step for transmitting user data for storage on a remote network server according to one aspect. As shown, the sequence of steps for transmitting user data involves the client 110, the authentication module 120, the module of creating encryption keys 130, the encryption module 140 and the data storage module 150.

First, the user prepares to transmit a certain set of data to the remote network server for storage in the data storage module 150. The user data may include, but not limited to: multimedia files (e.g., photos, videos, music, etc.), electronic documents, geolocation data of the user's device, usage statistics of the user's device, usage statistics of the software installed on the user's device, Internet usage statistics, user account records, chat room correspondence logs, instant messaging correspondence logs, and other data generated by the user's device.

Then, the client 110 collects from the user's device and sends to the authentication module 120 a user authentication data, which may include, but not limited to: user's login and password, user's email account names and passwords, user's social networks account names and passwords, user's instant messaging account names and passwords, various user's biometric identifiers, unique identifiers of the user's device (e.g., SIM card number), geolocation data of the user's device, and other type of user authentication data.

The authentication module 120 attempts to authenticate the user using the received user authentication data. If the authentication is successful, the authentication module 120 calculates a hash of the received user authentication data and sends it back to the client 110. The client 110 receives from the authentication module 120 the hash calculated from the user authentication data and saves it for later use. The client 110 then sends the received hash to the module of creating encryption keys 130, which generates a data encryption key. After the key has been generated, it is sent back to the client 110. The client 110 receives the key from the module of creating encryption keys 130 and saves it for later use.

When the user is ready to send data to the data storage module 150, the data is first received by the client 110, which forwards the received data along with the previously saved encryption key to the encryption module 140. The encryption module 140 uses the encryption key to encrypt the user data and sends the encrypted data back to the client 110. The client 110 then sends the encrypted data to the data storage module 150 for storage.

Figure 3:
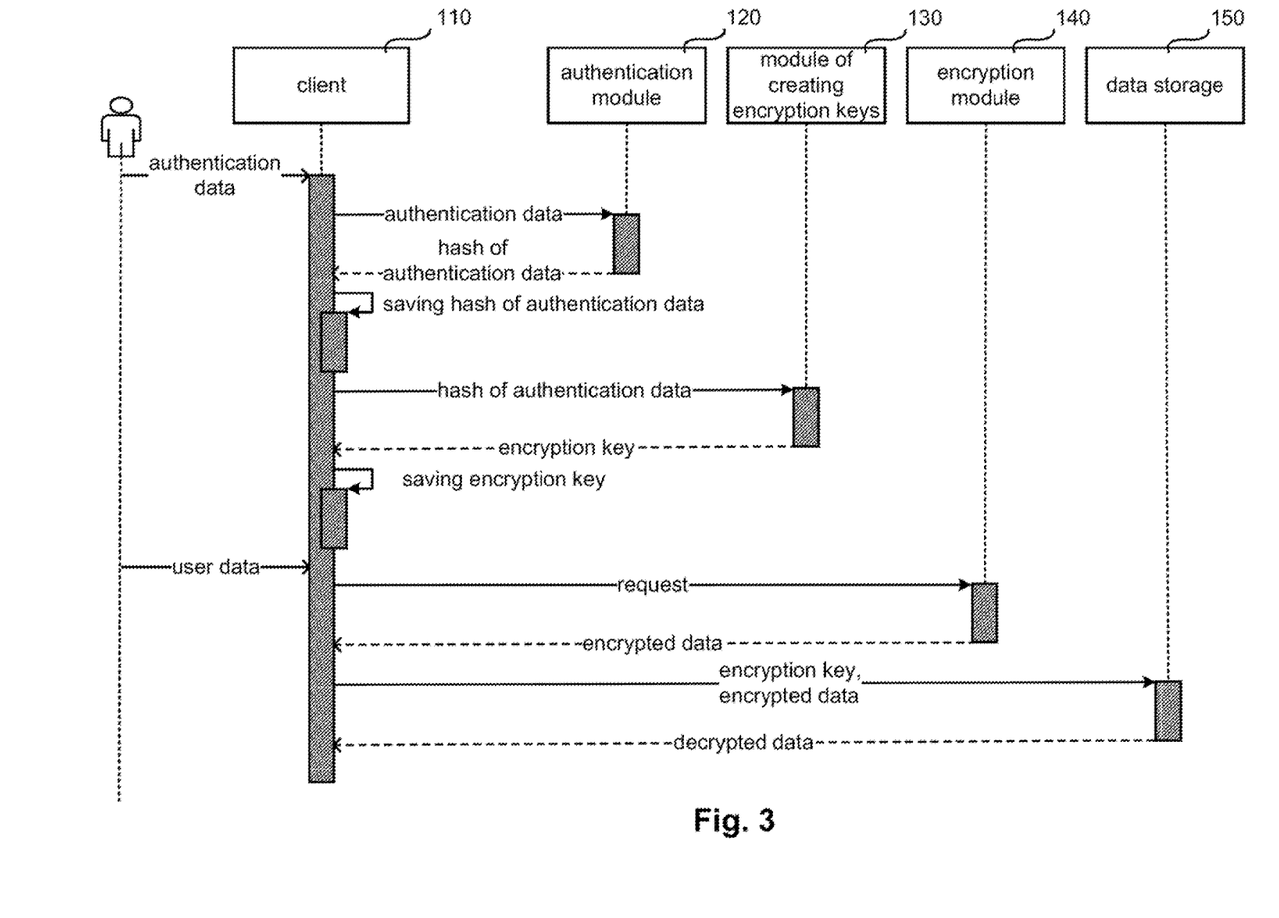
FIG. 3 illustrates a data flow diagram of an example sequence of steps for receiving user data from a remote network server according to one aspect.

FIG. 3 shows a diagram of an example sequence of steps of receiving user data from a remote network server according to one aspect. The sequence of steps of receiving user data from the remote network server involves a client 110, an authentication module 120, a module of creating encryption keys 130, an encryption module 140 and a data storage module 150.

First, the user can use client 110 to received an encrypted set of data from the data storage module 150, which can be a remote network server. After the user has entered his authentication data into the interface of client 110, the data is sent to the authentication module 120, which attempts to authenticate the user using received user authentication data. If the authentication is successful, a hash is calculated from the received user authentication data and sent back to the client 110. The client 110 receives the hash and saves it for later use. The client 110 then sends the received hash to the module of creating encryption key 130. After the module of creating encryption keys 130 has received from the client 110 the hash of the user authentication data, it calculates a data encryption key, and sends it back to the client 110. The client 110 receives the encryption key from the module of creating encryption keys 130 and saves it for later use.

When the user is ready to receive data from the data storage module 150, he uses the client 110 to send a request to the data storage module 150 to provide the required user data. After receiving the request from the client 110, the data storage module 150 provides the requested user data to the client 110. After the user data has been received, the client 110 will send it and the previously saved encryption key to the encryption module 140 for decryption of the received data. The encryption module 140 uses the encryption key to decrypt the user data and sends the decrypted data back to the client 110. After receiving the decrypted data from the encryption module 140, the client 110 provides the data to the user.

Figure 4:
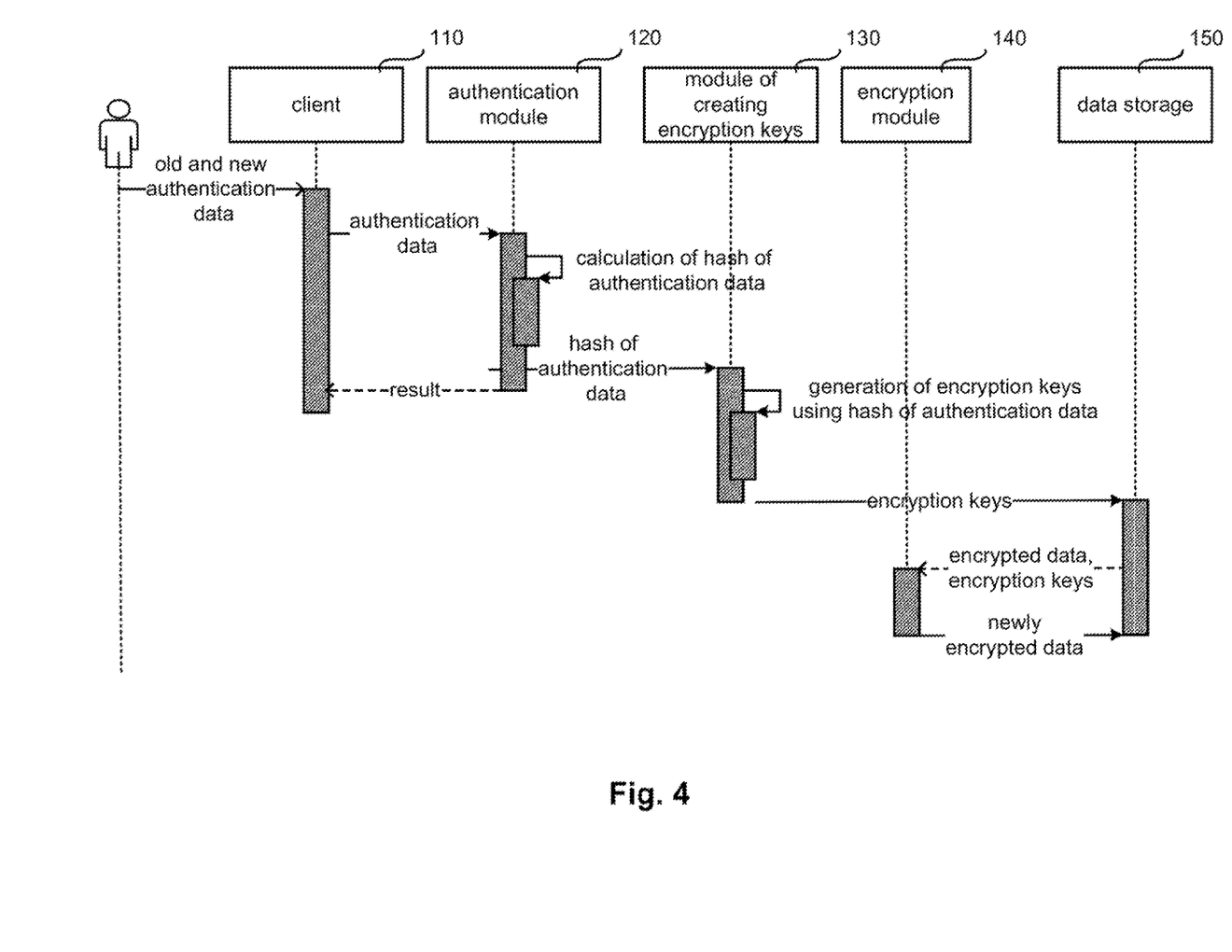
FIG. 4 illustrates a data flow diagram of an example sequence of steps of repeat encryption of user data on a remote network server upon change of a user password according to one aspect.

FIG. 4 shows a diagram of an example sequence of steps for repeat encryption of user data stored on a remote network server upon a change of the user authentication data according to one aspect. The sequence of steps for repeat encryption of user data involves a client 110, an authentication module 120, a module of creating encryption keys 130, an encryption module 140 and a data storage module 150.

If the user is changing his authentication data, the user data stored in the data storage module 150 should be encrypted again, because in connection with a changing of the user authentication data the encryption key received from the module of creating encryption keys 130 will also be changed, making it impossible to decrypt data with the old encryption key.

When the user changes his authentication data, the client 110 may be configured to send the old and the new authentication data to the authentication module 120. The authentication module 120 performs user authentication using old or new authentication data. In the event of a successful authentication, the authentication module 120 calculates a hash of the received user authentication data and sent it to the module of creating encryption keys 130. The module of creating encryption keys 130 calculates based on the received hashes the old and new data encryption keys. After the keys have been calculated, they are sent to the data storage module 150. The data storage module 150, after receiving from the module of creating encryption keys 130 the old and new encryption keys, sends these keys and the encrypted user data to the encryption module 140. The encryption module 140 decrypts the user data using the received old encryption key and then encrypts the decrypted user data using the received new encryption key. After the user data has been encrypted once again, the encrypted data may be sent back to the data storage module 150 to replace the old user data.

Figure 5:
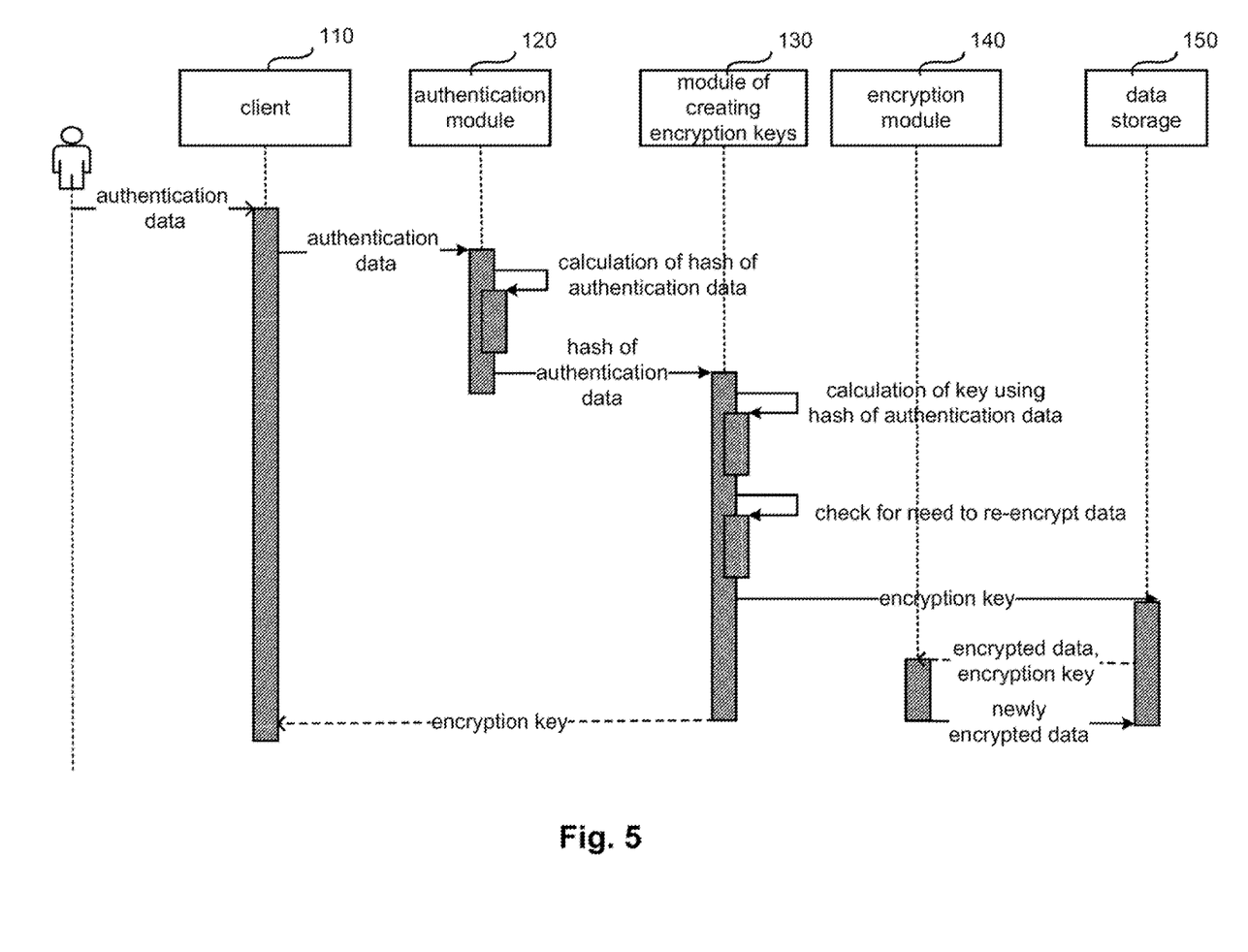
FIG. 5 illustrates a data flow diagram of an example sequence of steps of repeat encryption of user data on a remote network server when the user connects to the remote network server according to one aspect.

FIG. 5 shows a diagram of an example sequence of steps of repeat encryption of user data stored on a remote server when the user connects to the remote server. This sequence of steps for repeat encryption of user data stored on a remote server when the user connects to the remote server includes a client 110, an authentication module 120, a module of creating encryption keys 130, an encryption module 140 and a data storage module 150.

To enhance the security of user data stored in the data storage module 150, the user data may be periodically encrypted again by the encryption module 140 without the participation of the client 110 or the user 105. In one example aspect, the conditions for the repeat encryption of user data may include, but not limited to: the user has undergone authentication by the client 110 a predetermined number of times since the last repeat data encryption; a predetermined interval of time has passed since the last repeat data encryption; and so forth. The parameters controlling frequency of repeat data encryptions may be chosen based on a level of sensitivity of user data, user's security requirements or other criteria, so that repeat encryption may be performed on a weekly, monthly or semi-annual basis.

For example, when the encryption module 140 determines that conditions for the periodic repeat encryption of the user data stored in the data storage module 150 have been met, the encryption module 140 may instruct the authentication module 120 to obtain a new set of user authentication data, calculate a hash of the new set of user authentication data, and send it to the module of creating encryption keys 130. The encryption module 140 may then instruct the module of creating encryption keys 130 to create from the received hash a new encryption key for a new set of user authentication data. In one example aspect, the creation of the encryption keys can make use of a cryptographic "salt", which is generated by the module of creating encryption keys 130 for each unique user and is stored in this module. A salt may be a random data that is used as an additional input to a one-way function that hashes a password or passphrase. The primary function of salts is to defend against dictionary attacks versus a list of password hashes and against pre-computed rainbow table attacks. In one example, a new salt may be randomly generated for each use password. In one example, the salt and the password may be concatenated and processed with a cryptographic hash function, and the resulting output (but not the original password) may be stored with the salt in a database. Hashing allows for later authentication while defending against compromise of the plaintext password in the event that the database is somehow compromised. In one example aspect, when a repeat encryption of the user data is necessary, the module of creating encryption keys 130 may generate a new salt for the particular user. After this, the module of creating encryption keys 130 may send the new and old encryption keys to the encryption module 140. The encryption module 140 obtains the encrypted user data from the data storage module 150, decrypts it using the old encryption keys and then once again encrypts the decrypted user data using the new encryption key. The newly encrypted user data is then returned to the data storage module 150 where it is stored in place of the old user data.

Figure 6:
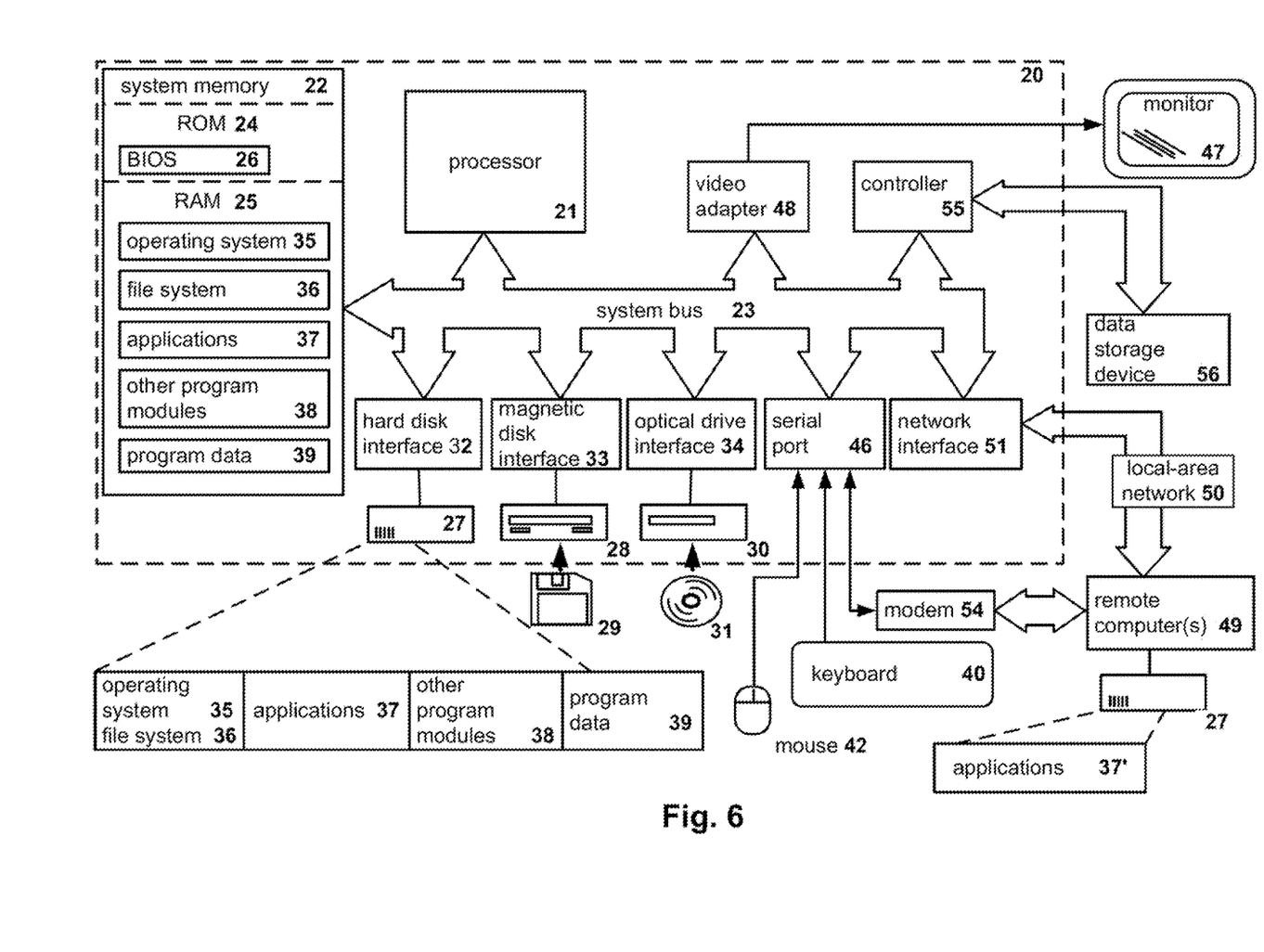
FIG. 6 illustrates an example of a general-purpose computer system, such as a personal computer or a network server, that may be used to implement the disclosed systems and method for encrypting user data according to one aspect.

FIG. 6 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the computer 20, such as those at the time of loading the operating system with the use of the ROM 24.

The computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer 20.

The computer 20 may include one or more hard disk drives 27, removable magnetic disks 29 and removable optical disks 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is stored, and also additional program applications 37, other program modules 38 and program data 39. The user is able to enter commands and information into the computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The computer 20 is able to work in a network environment, using a network connection to one or more remote computers 49. The remote computer (or computers) 49 may also be personal computers or servers having the majority or all of the aforementioned elements in describing the nature of the computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the internet. In LAN or WAN networks, the computer 20 is connected to the local-area network 50 across a network adapter or network interface 51. When networks are used, the computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for encryption of user data for storage on a remote server, comprising:
   collecting, by a software client executed by a hardware processor, one or more sets of user authentication data from a user device, wherein the user authentication data includes one or more sets of: user's login and password, user's email account name and password, user's social network account name and password, user's instant messaging account name and password, one or more user's biometric identifiers, one or more unique identifiers of the user device, and geolocation data of the user device;
   performing user authentication using the one or more sets of user authentication data;
   when user authentication is successful, calculating a hash of at least one set of the user authentication data;
   generating an encryption key from the hash of the user authentication data;
   encrypting the user data using the generated encryption key;
   transmitting the encrypted user data to the remote network server for storage; and
   periodically encrypting the user data by at least: generating random data that are used as an additional input to a one-way function that hashes a selected portion of the user authentication data for each unique user, generating a new encryption key based on a hash result of the one-way function, and encrypting the user data using the new encryption key.

2. The method of claim 1, wherein a software client includes software installed on the user device.

3. The method of claim 1, wherein a software client includes a web-based service.

4. The method of claim 1, further comprising:
   automatically performing repeat encryption of the user data using a new set of user authentication data, wherein the frequency of repeat data encryption is based on a level of sensitivity of the user data.

5. The method of claim 1, wherein generating an encryption key includes generating an encryption key using a symmetric-key encryption technique.

6. The method of claim 1, wherein generating an encryption key includes generating an encryption key using a cryptographic salt and a portion of the user authentication data.

7. The method of claim 1, further comprising:
   automatically performing repeat encryption of the user data using a new set of user authentication data when at least one of the following conditions occur: upon change in the user authentication data; when the user has undergone authentication by a predetermined number of times since the last repeat data encryption, and when a predetermined interval of time has passed since the last repeat data encryption.

8. A system for encryption of user data for storage on a remote server, comprising:
   a software client configured to collect one or more sets of user authentication data from a user device, wherein the user authentication data includes one or more sets of: user's login and password, user's email account name and password, user's social network account name and password, user's instant messaging account name and password, one or more user's biometric identifiers, one or more unique identifiers of the user device, and geolocation data of the user device;
   a user authentication module configured to:
      perform user authentication using one or more sets of user authentication data;
      when user authentication is successful, calculate a hash of at least one set of the user authentication data;
   a module for generating an encryption key configured to generate an encryption key from the hash of the user authentication data;
   an encryption module configured to encrypt the user data using the generated encryption key, and periodically encrypt the user data by at least: generating random data that are used as an additional input to a one-way function that hashes a selected portion of the user authentication data for each unique user, generating a new encryption key based on a hash result of the one-way function, and encrypting the user data using the new encryption key; and wherein the software client is further configured to transmit the encrypted user data to the remote network server for storage.

9. The system of claim 8, wherein a software client includes software installed on the user device.

10. The system of claim 8, wherein a software client includes a web-based service.

11. The system of claim 8, wherein the encryption module is further configured to:

automatically perform repeat encryption of the user data using a new set of user authentication data, wherein the frequency of repeat data encryption is based on a level of sensitivity of the user data.

12. The system of claim 8, wherein generating an encryption key includes generating an encryption key using a symmetric-key encryption technique.

13. The system of claim 8, wherein generating an encryption key includes generating an encryption key using a cryptographic salt and a portion of the user authentication data.

14. The system of claim 8, wherein the encryption module is further configured to:

automatically perform repeat encryption of the user data using a new set of user authentication data when at least one of the following conditions occur: upon change in the user authentication data; when the user has undergone authentication by a predetermined number of times since the last repeat data encryption, and when a predetermined interval of time has passed since the last repeat data encryption.

15. A computer program product stored on a non-transitory computer-readable storage medium, the computer program product comprising computer-executable instructions for encryption of user data for storage on a remote server, including instructions for:

collecting, by a software client executed by a hardware processor, one or more sets of user authentication data from a user device, wherein the user authentication data includes one or more sets of: user's login and password, user's email account name and password, user's social network account name and password, user's instant messaging account name and password, one or more user's biometric identifiers, one or more unique identifiers of the user device, and geolocation data of the user device;

performing user authentication using one or more sets of user authentication data;

when user authentication is successful, calculating a hash of at least one set of the user authentication data;

generating an encryption key from the hash of the user authentication data;

encrypting the user data using the generated encryption key;

transmitting the encrypted user data to the remote network server for storage; and periodically encrypting the user data by at least: generating random data that are used as an additional input to a one-way function that hashes a selected portion of the user authentication data for each unique user, generating a new encryption key based on a hash result of the one-way function, and encrypting the user data using the new encryption key.

16. The computer program product of claim 15, wherein a software client includes software installed on the user device.

17. The computer program product of claim 15, wherein a software client includes a web-based service.

18. The computer program product of claim 15, further comprising instructions for:

automatically performing repeat encryption of the user data using a new set of user authentication data, wherein the frequency of repeat data encryption is based on a level of sensitivity of the user data.

19. The computer program product of claim 15, wherein generating an encryption key includes generating an encryption key using a symmetric-key encryption technique.

20. The computer program product of claim 15, further comprising instructions for:

automatically performing repeat encryption of the user data using a new set of user authentication data when at least one of the following conditions occur: upon change in the user authentication data; when the user has undergone authentication by a predetermined number of times since the last repeat data encryption, and when a predetermined interval of time has passed since the last repeat data encryption.

* * * * *